United States Patent

Hart

[11] 3,915,362
[45] Oct. 28, 1975

[54] VEHICLE LUGGAGE CARRIER AND COMPLEMENTARY MOUNTING MEMBERS

[76] Inventor: Donald G. Hart, R.R. No. 1, Geneseo, Ill. 61254

[22] Filed: Jan. 14, 1974

[21] Appl. No.: 433,099

[52] U.S. Cl. ............ 224/42.1 E; 206/509; 220/4 B
[51] Int. Cl.² ............................................ B60R 9/04
[58] Field of Search ...... 224/42.1 E, 29 R, 42.42 R, 224/42.45 R; 220/4 E, 4 R, 4 B, 18, 315, 69; 248/311; 211/126; 206/511, 509

[56] References Cited
UNITED STATES PATENTS

| 3,396,867 | 8/1968 | Garriga | 220/4 E X |
| 3,464,579 | 9/1967 | Asenbauer | 220/4 B |
| 3,526,314 | 9/1970 | Trammell | 220/18 X |

FOREIGN PATENTS OR APPLICATIONS

| 364,267 | 10/1938 | Italy | 224/42.1 E |
| 1,939,154 | 8/1969 | Germany | 224/42.1 E |
| 1,580,844 | 8/1969 | France | 224/42.1 E |

Primary Examiner—Frank E. Werner
Assistant Examiner—Jerold M. Forsberg
Attorney, Agent, or Firm—Henderson & Storm

[57] ABSTRACT

A vehicular luggage carrier including a pair of hinged halves, one half having parallel cavities formed in a bottom thereof, and devices for mounting the halves on a vehicle set into the cavities.

1 Claim, 3 Drawing Figures

VEHICLE LUGGAGE CARRIER AND COMPLEMENTARY MOUNTING MEMBERS

BACKGROUND OF THE INVENTION

The invention is concerned with car luggage carriers particularly adapted for, but not limited to mounting on the top of the car. There are innumerable types of such carriers, and applicant has determined to provide a novel carrier of the most rugged structure but of the least costly. A molded carrier of hard plastic fits these requirements, and applicant devised that. A seemingly insurmountable problem arose, however, upon mounting the carrier using conventional wooden or the like bars with suction cups attached at each end, the bars bolted to the bottom of the carrier. Use of this arrangement resulted in fracturing of the hard plastic about the fastening areas. This was caused due to the flexing action permitted by the flat bottom; and which bottom portion was insufficiently stiff, the fracturing starting around the connections.

To the solution of this problem with synergetic results was the basis of this invention.

SUMMARY OF THE INVENTION

A car luggage carrier of extremely hard plastic, of sufficient strength that an ordinary person could jump thereon without damage, including hinged halves the lower one of which has a pair of parallel cavities formed in the bottom thereof of sufficient depth to receive in each an elongated mounting bar, wherein the arrangement of the cavities and bars provides a sturdy mounting unit tending to limit if not completely obviate fracturing of the said bottom, and with the bonus of providing stiffeners for the bottom.

It is an object of this invention to provide a novel vehicular luggage carrier.

It is another object of this invention to provide an improved car luggage carrier.

Another object of this invention is to provide a car luggage carrier of hard plastic having hinged halves, the bottom of one half having stiffeners formed therein for aiding in preventing fracturing of the said half in use.

Yet another object of this invention is the provision of a car luggage carrier having such stiffeners, and wherein the stiffeners serve in a dual capacity, also providing cavities for receiving the mounting bars therein, thereby additionally strengthening the bottom of the carrier.

It is yet another object of this invention to provide a car luggage carrier capable of attaining the above defined objectives which is rugged, economical and effective.

These objects and other advantages of this invention will become obvious from the following description when taken in conjunction with the accompanying drawings.

DESCRIPTION OF THE PREFERRED EMBODIMENT

Figure 1:
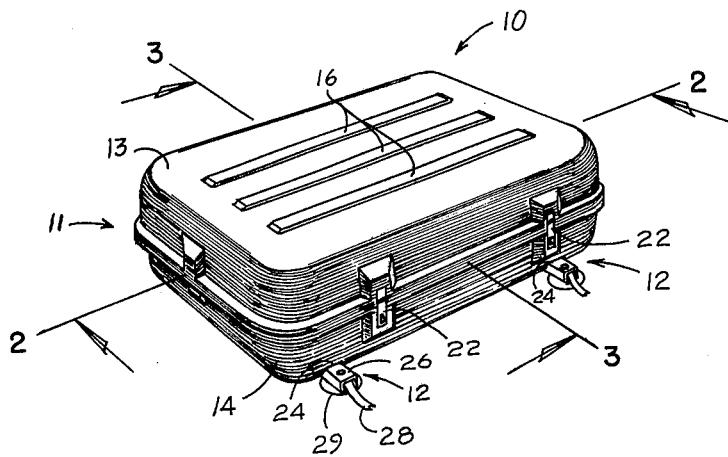
FIG. 1 is a perspective view of a preferred embodiment of this invention.

Referring to FIG. 1, a preferred embodiment of the invention is illustrated generally at 10 and is comprised basically of a case 11 and a pair of mounting devices 12 for securing the case to the top, for example, of a vehicle (not shown).

Figure 2:
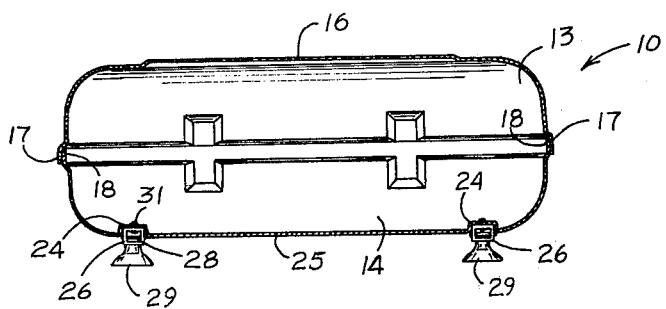
FIG. 2 is a vertical sectional view as taken along the line 2—2 in FIG. 1.
Figure 3:
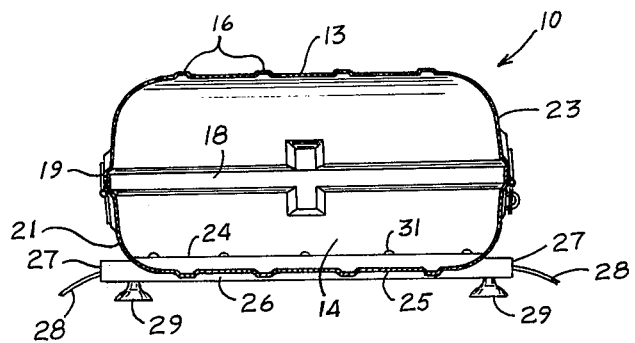
FIG. 3 is a vertical sectional view as taken along the line 3—3 in FIG. 1.

The case 11 is manufactured of a hard, commerically available, plastic such that the case 11 is extremely rugged. It includes an upper half 13 (FIG. 2) and a lower half 14 adapted to fit together as illustrated for holding luggage and the like. A plurality of parallel ribs 16 (FIGS. 1 and 3) are formed in the top of the upper half 13, running longitudinally or end-to-end therein. An outer flange 17 (FIG. 2) formed about the upper half 13 fits flush over the inner flange 18 of the lower half 14, and the halves are hingedly connected by hinges 19 at the rear 21 of the case and latches 22 connected to the front 23 thereof.

Formed in the bottom of the lower half 14 are a pair of parallel cavities 24 which extend from the front 23 to the rear 21 of the case 11, and which extend upwardly into the chamber of the case. Similarly to the ribs 16, to which the cavities 24 extend at right angles, the cavities form stiffening means for the bottom 25 of the case lower half 14.

The mounting devices 12 are identical and only one will be described, with like references indicating like parts. Each device 12 includes an elongated tubular member 26 of a size to fit in a complimentary manner into a cavity 24 and with the ends 27 of the member 26 extended outwardly from the ends of the cavity 24. A strap 28 extended from each end of each member 26 for connection by a conventional clasp (not shown) to the vehicle.

The tubular members 26 are connected to the upper walls of the cavities 24 by fasteners 31 of a conventional nature. To the bottom of each member 26, a pair of suction cup devices 29 are secured for conventional support of the carrier 11 on the top or other surface of the vehicle.

From the foregoing, it can be seen that the luggage carrier 11 of this preferred embodiment is capable of attaining the objectives set forth herein.

I claim:

1. A vehicular luggage carrier assembly comprising:
   case means including upper and lower case halves hingedly connected for open and closed conditions, said case halves having parallel ribs formed in the top and bottom of said halves, respectively;
   means for strengthening said lower case half extending upwardly toward said upper case half and forming a pair of cavities in the bottom of said lower case half for strengthening said lower case half;
   means for mounting said case means on a vehicle secured to said case means within said cavities, said means for mounting including a pair of tubular members each fitted flush within one of said cavities whereby fracturing of said lower case half is prevented;
   wherein said cavities extend across the bottom of said lower case half in parallel relationship and said tubular members extend beyond the ends of said cavities, said tubular members having a plurality of means for detachably engaging the vehicle; and
   wherein said cavities are identical and are normal to the direction of the ribs; and wherein said cavities and said tubular members are each of a right angular shape in cross section, whereby said cavities and said tubular members are adapted to fit together in a flush manner.

* * * * *